United States Patent Office 2,790,757
Patented Apr. 30, 1957

2,790,757
PROCESS FOR ALLYLIC BROMINATION OF ESTERS OF OLEFINIC CARBOXYLIC ACIDS

Hermann Schaltegger, Flamatt, Bern, Switzerland

No Drawing. Application August 11, 1954,
Serial No. 449,269

12 Claims. (Cl. 204—158)

The present invention relates to a process for the preparation of esters of olefinic carboxyl acids brominated in the α-position to the olefinic double bond.

K. Ziegler et al., Annalen der Chemie, vol. 551 (1942), p. 80, discovered that ethylenically unsaturated carboxylic acid compounds, such as crotonic acid methyl ester

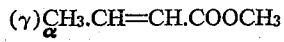

can indirectly be brominated in the α-position to the ethylenic double-bond (the so-called allyl-position), γ-bromocrotonic acid methyl ester, for example, being formed thereby. These authors have proposed to make use for the introduction of bromine in this manner into unsaturated carboxylic acid compounds of N-halogen-compounds, particularly the N-bromosuccinimide, reacting in the following manner:

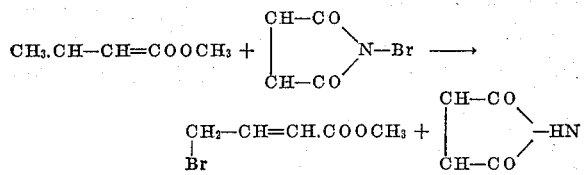

According to the opinion of these authors and to general experience, it was believed impossible to introduce halogen directly into such complicated olefinic compounds without attacking the double bond. With the use of free halogen, halogen addition products were always obtained containing the halogen at the carbon atoms of the original double bond.

On the other hand, H. P. A. Groll et al. in United States Patent No. 2,130,084, dated September 13, 1938, have proposed to chlorinate simple olefinic hydrocarbons, such as propylene and butylene, in allyl position directly by free chlorine. This chlorination, however, had to be carried out in the gaseous phase and at high temperatures, preferably above 200° C. and at such high temperatures as 350° to 675° C. if the allyl chlorination should predominate, while when using lower temperatures, even such an elevated temperature as about 100° C., halogen addition to the olefinic linkage was found to be the normal halogenation reaction.

Apart from the disadvantage generally connected with the use of high temperatures in halogenation reactions, it is to be considered that this known process cannot bring about favorable results if more complicated compositions than the simple olefins are to be treated, for example compositions of the type which the process of the present invention is concerned with. Far reaching, if not complete decomposition of the starting materials as well as of the halogenation products formed would take place if Groll et al.'s process were used for the treatment of such more complicated compositions.

In my United States patent application Serial No. 114,691, filed September 8, 1949, now Patent No. 2,647,867, it has been proposed for the first time, to produce 7-bromo-cholesteryl esters by directly introducing bromine in the α-position to the double bond without attacking this double bond. This reaction was thought to be specific for cholesterol.

It has, however, surprisingly been found that the reaction there employed can also be used in the treatment of compositions of an entirely different structure.

It has been ascertained that the esters of olefinic carboxylic acids can be brominated in a dilute solution in the α-position to the double bond by free bromine under the influence of light and that, for example, crotonic acid methyl ester can be transformed by this method into the same γ-bromo-crotonic acid methyl ester obtained by the considerably more complicated known method of K. Ziegler et al. mentioned before. The reaction is accomplished according to the equation:

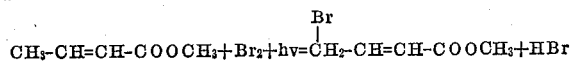

The essential difference in comparison with Ziegler et al.'s process is to be seen in that instead of the expensive and difficultly prepared N-bromosuccinimide the relatively cheap free bromine can be used. Considerable technical importance is obtained thereby for the process in accordance with the present invention, the bromo-olefinic carbonic acid esters produced being of great technical value as intermediate products for numerous organic syntheses. It is necessary to start from the esters in question as the free carboxyl groups of the acids would be disturbing in the bromination reaction.

It is thus an object of my present invention to produce the esters of unsaturated bromo-carboxylic acids by substitution of a hydrogen radical of the ethylenic or methyl group which is in α-position to the olefinic double bond by free bromine.

It is another object of this invention to obtain the substitution of an α-hydrogen atom of an ester of an olefinic carboxylic acid in dilute solution by free bromine.

It is a further object of this invention to produce esters of unsaturated aliphatic bromo-carboxylic acids with the use of free bromine at ordinary or slightly elevated temperature.

Other objects and advantages of the invention will become apparent from the following specification and the annexed claims.

With these and other objects in view, my present invention has as its basis the idea that the addition of halogen to the olefinic double bond of unsymmetric aliphatic molecules (i. e. such with one-sided arrangement of functional groups) takes place via an ionic mechanism. On the other hand, it is known that halogen substitution to saturated carbon groups takes place via radical chains, as for example in the chlorination of methane under the influence of light.

It has now been found that it is possible by avoiding the presence of polar solvents and with the use of light to decrease the addition of bromine to the double bond to such a degree and, on the other hand, to favor the substitution of hydrogen by bromine in such a measure that about 80% and more of the theoretical amount of the bromo-substituted olefinic carboxylic ester, e. g. 80% of γ-bromocrotonic acid ester, are obtained.

Further investigation has shown that the concentration of the esters of olefinic carboxylic acids to be treated in a non-polar solvent, e. g. in carbon disulfide or tetrachloromethane, is of very high importance if good results and high yields in the bromo-substituted unsaturated carboxylic acid esters are to be obtained, and that it is necessary for this purpose to make use of highly dilute solutions of the unsaturated compounds to be brominated. From an economic point of view it has proved best to carry out this bromination in solutions of 1–3% content. The choice among the non-polar solvents indifferent against halogen is not very great if considered from a practical point of view, as most of these solvents except CCl₄ and CS₂ either have boiling points which are by far too low for the use of such solvents in technically carrying out the present process in a simple manner, or their boiling points are so high (over 100° C.) that secondary decomposition reactions may occur if such solutions are heated to boiling at ordinary pressure.

It has also been found that it is advisable to employ the bromine, too, in a dilute state. Preferably, the dilute bromine solution is added gradually to the solution of the ester of an unsaturated carboxylic acid within a period of 40 to 80 minutes, as otherwise addition of bromine at the place of the double linkage may occur, at least to a substantial degree. Substitution, instead of addition, of bromine is further assisted by quickly distributing the bromine in the reaction solution by stirring, shaking the reaction vessel, introducing the bromine below the surface of the solution under treatment, or the like.

The new process can be used for the substitution-bromination of very numerous different types of ethylenically unsaturated carboxylic acid esters, such as:

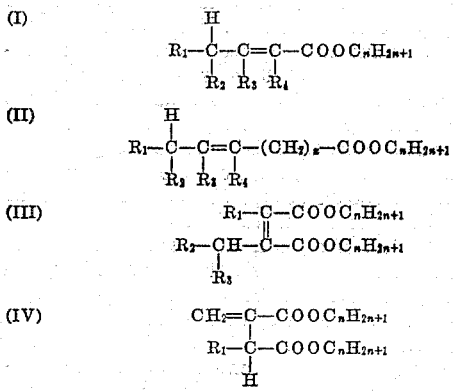

(V) $R_1-CH=CH-(CH_2)_x-CH=CH-(CH_2)_y-COOCH_3$ and so on, wherein $R_1$, $R_2$, $R_3$ and $R_4$, each, may be either hydrogen, an alkyl, aryl, aralkyl radical with or without functional groups, esterified or etherified hydroxyl groups and/or members of a closed isocyclic ring, and $n$, $x$ and $y$, each, may be any of the usual integers.

Compositions of these types are for example the esters of any of the following acids: cis- and transcrotonic acid, senecionic acid, pentene-2-carboxyclic acid, -1,2-hexene carboxylic acid and other homologues thereof, angelic acid, tiglic acid, citronellic acid, 3-pentene carboxylic acid, 4-hexene carboxylic acid, oleic acid, elaidic acid, erucic acid, geranic acid, linoleic acid, γ-phenylcrotonic acid, citraconic acid, itaconic acid, and glutaconic acid.

All allyl-halogenated acid esters give with alcoholic silver nitrate solution a spontaneous precipitation of silver halide, which is characteristic for them and for the allyl-brominated compounds particularly, and proves the loose binding of the bromine in the allyl position.

Example 1

Particulars of experimentally carrying out the new process will be described hereinafter for the examples of the crotonic acid methyl and ethyl esters.

(a) 10 g. (0.1 mol) of crotonic acid methyl ester are dissolved in 1 liter of carbon tetrachloride and heated to gentle boiling in a cylindrical glass vessel. The glass vessel is surrounded by four 200-watt bulbs, and is provided with stirrer, dropping funnel and descending condenser. Into this glass vessel a solution of 16 g. bromine in 200 cc. carbon tetrachloride is gradually dropped during 40 minutes while stirring and with irradiation. Simultaneously the hydrobromic acid forming is distilled off together with carbon tetrachloride. After all of the bromine has been introduced, the remaining solvent is evaporated in vacuo and the residue is fractionated in a vacuum of about 15 mm. Hg. γ-Bromocrotonic acid methyl ester of a boiling point 89–90° C./16 mm. is obtained in a yield of 81% of the theoretical amount.

(b) 38 g. (⅓ mol) of crotonic acid ethyl ester dissolved in 1.5 liters of carbon tetrachloride are heated to gentle boiling while stirring. From a gas washing bottle connected with the reaction vessel, 53.3 g. (⅓ mol) of bromine are transferred into the boiling solution by means of nitrogen gas or another indifferent gas. During the bromination, irradiation is effected by four 200-watt lamps, and the hydrobromic acid forming is distilled off together with carbon tetrachloride. The nitrogen flow is regulated so that the whole amount of bromine is introduced into the reaction vessel within 68 minutes. It is essential to take care that the bromine concentration in the gaseous mixture to be introduced does not get too high. If necessary or desired, the gas washing bottle where the bromine vapor is developed, is cooled by cold water with the addition of some ice. Entirely water-free reagents and solvents are an indispensable condition for obtaining good results in the bromination. After introduction of the entire amount of bromine required, the brominated solution is evaporated in vacuo at about 40° C., and the residue is then fractionated in a vacuum. The following fractions are obtained:

Forerunnings: 49–96.5° C./14 mm.: 2.58 g. Br found= 31.2% (calculated 41.4% for 1 Br)
1. Fraction: 97–101°/14 mm.: 12.14 g. Br found=39.9% (calculated 41.4% for 1 Br)
2. Fraction: 100–101°/14 mm.: 38.17 g. Br found= 40.1% (calculated 41.4% for 1 Br)
Afterrunnings: 101–146°/13 mm.: 12.17 g. (main portion between 101–103° C.)

Yield: 50.31 g. of pure colorless bromocrotonic ethyl ester, i. e. 78.8% of the theoretical amount. From the forerunnings and the afterrunnings still 3.1 g. of the pure product are obtainable by repeated fractionation, so that the entire yield is 83.6%.

All fractions show strong cyclohexylamine reaction.

*Examples 2–6*

| Type of Process | Start Material | Concentration of Solution | Bromine (g.) in cc. Solvent | Period of Irradiation | Yield in Monobromo Compounds; B. P. in C. Main fract. |
|---|---|---|---|---|---|
| (a) | 2-pentene-carboxylic acid methyl ester | 11 g./700 cc. CS₂ | 16/400 CS₂ | 35′ | 71% 88–92°/13 mm. |
| (a) | ---do--- | 23.2 g./1,100 cc. CCl₄ | 32.6/500 CCl₄ | 39′ | 80.5% 89–93°/13 mm. |
| (a) | 2-hexene-2 carbox. acid methyl ester | 13.0 g./1,100 cc. CCl₄ | 16.3/800 CCl₄ | 52′ | 69% 100–101°/13 mm. |
| (a) |  | 13.1 g./1,100 cc. CS₂ | 16.4/800 CS₂ | 46′ | 81.4% 100–102.5°/14 mm. |
| (b) | oleic acid methyl ester | 59.3 g./1,200 cc. CCl₄ | 1:5 CCl₄ | 55′ | 61% with 19.8% Bromine (calculated 21.3%). |
| (a) | linoleic acid methyl ester | 60 g./1,100 cc. CCl₄ | 32/800 CCl₄ | 55′ | 56%. |

Example 7

16. of citraconic acid dimethyl ester are dissolved in 800 cc. of carbon tetrachloride and the solution is irradiated by several fluorescent lamps. A solution of 16 g. of bromine in 400 cc. carbon tetrachloride is added drop-wise during 80 minutes to said first named solution while boiling and stirring it. The velocity of the distilling-off of the mixture of HBr and solvent is controlled in such a manner that the volume of the reaction solution remains approximately constant which can easily be achieved by employment of diminished pressure. Titration shows that a degree of substitution of 88% is obtained. The faintly yellowish carbon tetrachloride solution is evaporated in vacuo. The residue consists of a faintly yellow oil fuming at the air and immediately giving with alcoholic silver nitrate solution in the cold a precipitation of silver bromide.

Numerous modifications and variations of the process described may be devised without departing from the principles and the true spirit of the invention, no other limit being imposed than those indicated in the annexed claims.

This application is a continuation-in-part of my copending application, Serial No. 220,344, filed April 10, 1951, now abandoned.

What I claim is:

1. A process for the allylic bromination of an ester of an ethylenically unsaturated aliphatic carboxylic acid which comprises reacting bromine with a dilute solution containing not more than about 2% of said ester dissolved in a solvent while irradiating the reaction mixture with light.

2. A process in accordance with claim 1, wherein the bromine, too, is employed in a dilute state.

3. A process in accordance with claim 2, wherein the bromine is dissolved in the same type of solvent as the material under treatment.

4. A process in accordance with claim 2, wherein the bromine is diluted by an indifferent gas.

5. A process in accordance with claim 4, wherein the inert gas is nitrogen.

6. A process in accordance with claim 1, wherein a relatively low boiling inert non-polar solvent is employed.

7. A process in accordance with claim 1, wherein the hydrogen bromide formed during the reaction is continuously removed from the reaction solution by distillation together with solvent vapors.

8. A process in accordance with claim 6, wherein the treatment of the dilute solution of said olefinic compound under treatment with bromine is carried out at a moderate temperature not higher than that of the boiling point of the relatively low boiling non-polar solvent.

9. A process in accordance with claim 1, wherein the bromine is added gradually to the dilute solution of said olefinic compound under treatment and only in such a degree that side-reactions by the presence of excess bromine in the solution are avoided.

10. A process in accordance with claim 1, wherein the dilute solution of said olefinic compound to be reacted upon by the bromine contains 1 to 2% of said olefinic compound under treatment.

11. A process in accordance with claim 1, wherein said dilute solution is stirred during the treatment with bromine.

12. A process for the preparation of an ester of an ethylenically unsaturated aliphatic carboxylic acid brominated in α-position to the double bond comprising the steps of dissolving an ester of an ethylenically unsaturated aliphatic carboxylic acid in a relatively low boiling non-polar inert solvent in such amount to form a solution having a concentration of not more than about 2% of said ester, gradually introducing bromine into said solution while irradiating said solution with light and maintaining it at a temperature not higher than the boiling point of said solvent, simultaneously removing hydrobromic acid as formed during the reaction, and separating from said solution the ester which is brominated in α-position to the double bond.

References Cited in the file of this patent
UNITED STATES PATENTS

| | | |
|---|---|---|
| 2,590,637 | Miescher et al. | Mar. 25, 1952 |
| 2,633,451 | Schaltegger | Mar. 31, 1953 |
| 2,647,867 | Schaltegger | Aug. 4, 1953 |